(12) United States Patent
Grall

(10) Patent No.: US 8,287,984 B2
(45) Date of Patent: Oct. 16, 2012

(54) ROOFING UNDERLAY SCREEN

(75) Inventor: Patrick Grall, Treguex (FR)

(73) Assignee: Loda S.A.R.L. (FR)

( * ) Notice: Subject to any disclaimer, the term of this patent is extended or adjusted under 35 U.S.C. 154(b) by 981 days.

(21) Appl. No.: 12/303,955

(22) PCT Filed: Jun. 7, 2007

(86) PCT No.: PCT/EP2007/005057
§ 371 (c)(1),
(2), (4) Date: Dec. 8, 2008

(87) PCT Pub. No.: WO2007/141027
PCT Pub. Date: Dec. 13, 2007

(65) Prior Publication Data
US 2010/0209663 A1  Aug. 19, 2010

(30) Foreign Application Priority Data
Jun. 8, 2006 (FR) .................. 06 05107

(51) Int. Cl.
*B32B 3/10* (2006.01)
*B32B 38/04* (2006.01)
*E04B 1/62* (2006.01)
*E04D 5/04* (2006.01)
*E04D 3/35* (2006.01)
*B32B 3/24* (2006.01)
*B32B 15/14* (2006.01)

(52) U.S. Cl. ........ 428/137; 428/114; 428/131; 428/138; 428/596; 428/615; 428/621; 428/622; 428/623; 428/630; 442/232; 442/233; 442/234; 442/235; 442/236; 442/239; 442/246; 442/255; 442/262; 442/268; 442/378; 156/87; 156/250; 156/252; 156/253; 52/408; 52/506.01

(58) Field of Classification Search .................. 442/247, 442/378, 232–236, 255, 262, 268
See application file for complete search history.

(56) References Cited

U.S. PATENT DOCUMENTS
2,726,977 A * 12/1955 See et al. ..................... 428/138
(Continued)

FOREIGN PATENT DOCUMENTS
DE   20 2004 007 543 U1   8/2004
(Continued)

OTHER PUBLICATIONS
Machine Translation of FR 2871822 A1, Dec. 2005.*

*Primary Examiner* — David Sample
*Assistant Examiner* — Jeff Vonch
(74) *Attorney, Agent, or Firm* — John K. Park; Park Law Firm

(57) ABSTRACT

The invention concerns an under-roof screen (100) comprising:

- a first layer (102) produced from a first metallic or metallized material forming a thermal reflection barrier;
- a second layer (108) produced from a second woven material bonded to the first layer (102);
- a third layer (106) produced from a third insulating material and bonded to the second layer (108); and
- a fourth layer (104) produced from a fourth metallic or metallized material forming a thermal reflection barrier and bonded to the third layer (106);
- the first layer (102) and the second layer (108) being provided with micro-perforations (110) providing permeability to water vapor and impermeability to water and the fourth layer (104) being provided with perforations (112) providing permeability to water vapor.

13 Claims, 3 Drawing Sheets

U.S. PATENT DOCUMENTS

| | | | | |
|---|---|---|---|---|
| 4,230,057 A | * | 10/1980 | Kurz | 112/420 |
| 4,282,283 A | * | 8/1981 | George et al. | 442/281 |
| 4,500,592 A | * | 2/1985 | Lee et al. | 442/230 |
| 4,637,947 A | * | 1/1987 | Maekawa et al. | 428/68 |
| 4,777,086 A | * | 10/1988 | Madden et al. | 442/394 |
| 5,204,172 A | * | 4/1993 | Gidley | 442/232 |
| 5,231,814 A | * | 8/1993 | Hageman | 52/408 |
| 5,755,900 A | * | 5/1998 | Weir et al. | 156/62.2 |
| 6,308,482 B1 | * | 10/2001 | Strait | 52/408 |
| 6,599,850 B1 | * | 7/2003 | Heifetz | 442/376 |
| 6,869,661 B1 | * | 3/2005 | Ahr | 428/137 |
| 2002/0086599 A1 | * | 7/2002 | McNally et al. | 442/117 |
| 2005/0153616 A1 | * | 7/2005 | Suda et al. | 442/327 |
| 2006/0281379 A1 | * | 12/2006 | Haas et al. | 442/36 |
| 2007/0077838 A1 | * | 4/2007 | Binkley et al. | 442/286 |
| 2008/0032114 A1 | * | 2/2008 | Squires et al. | 428/308.4 |

FOREIGN PATENT DOCUMENTS

| | | |
|---|---|---|
| EP | 1 400 348 A2 | 3/2004 |
| FR | 2871822 A1 * | 12/2005 |
| GB | 2355430 A * | 4/2001 |
| GB | 2388815 A * | 11/2003 |
| GB | 2405415 A * | 3/2006 |
| WO | WO 99/60222 A1 * | 11/1999 |

* cited by examiner

ROOFING UNDERLAY SCREEN

BACKGROUND OF THE INVENTION

The present invention concerns an under-roof screen and a method for manufacturing such an under-roof screen.

An under-roof screen is known that comprises a synthetic thermal insulation layer impregnated with bitumen. The rigidity of such an under-roof screen makes it possible to fix it to main rafters spaced apart by 90 cm. However, such an under-roof screen is not easy to produce and use.

SUMMARY OF THE INVENTION

One object of the present invention is to propose an under-roof screen that does not have the drawbacks of the prior art.

To this end, an under-roof screen is proposed comprising:
  a first layer produced from a first metallic or metallised material forming a thermal reflection barrier;
  a second layer produced from a second woven material bonded to the first layer;
  a third layer produced from a third insulating material and bonded to the second layer; and
  a fourth layer produced from a fourth metallic or metallised material forming a thermal reflection barrier and bonded to the third layer;
  the first layer and the second layer being provided with micro-perforations providing permeability to water vapour and impermeability to water and the fourth layer being provided with perforations providing permeability to water vapour.

Advantageously, the bonding of the various layers to each other is achieved by thermal bonding.

Advantageously, the diameter of the micro-perforations is less than or equal to 20 μm.

Advantageously, the first material and the fourth material are aluminium or aluminised material.

Advantageously, the second woven material is woven glass fibre.

Advantageously, the third insulating material is non-woven glass fibre.

The invention also proposes a method of manufacturing an under-roof screen according to one of the above variants, comprising:
  a step of supplying a first layer produced from a first metallic or metallised material forming a thermal reflection barrier;
  a step of supplying a second layer produced from a second woven material;
  a step of bonding the second layer to the first layer;
  a step of supplying a third layer produced from a third insulating material;
  a step of bonding the third layer to the second layer thus bonded;
  a step of supplying a fourth layer produced from a fourth metallic or metallised material forming a thermal reflection barrier;
  a step of bonding the fourth layer to the third layer thus bonded;
  a step of producing, in the first layer and second layer, micro-perforations providing permeability to water vapour and impermeability to water; and
  a step of producing, in the fourth layer, perforations providing permeability to water vapour.

According to a particular embodiment, the under-roof screen comprises a fifth layer produced from a fifth breathing material, the said fifth layer being bonded between the second layer and the third layer.

Advantageously, the fifth breathing material is of the polyethylene, polyurethane or polypropylene type, or a mixture of these products with calcium carbonate.

The invention also proposes a method of manufacturing an under-roof screen according to the above particular embodiment, which comprises:
  a step of supplying a first layer produced from a first metallic or metallised material forming a thermal reflection barrier;
  a step of supplying a second layer produced from a second woven material;
  a step of bonding the second layer to the first layer;
  a step of supplying a fifth layer produced from a fifth breathing material;
  a step of bonding the fifth layer to the second layer thus bonded;
  a step of supplying a third layer produced from a third insulating material;
  a step of bonding the third layer to the fifth layer thus bonded;
  a step of supplying a fourth layer produced from a fourth metallic or metallised material forming a thermal reflection barrier;
  a step of bonding the fourth layer to the third layer thus bonded;
  a step of producing, in the first layer and second layer, micro-perforations providing permeability to water vapour and impermeability to water; and
  a step of producing, in the fourth layer, perforations providing permeability to water vapour.

According to a particular embodiment, the under-roof screen comprises a sixth layer produced from a sixth material consisting of a woven sheet bonded to the fourth layer and disposed between the third layer and the fourth layer.

Advantageously, the sixth layer is provided with perforations aligned with the perforations in the fourth layer.

Advantageously, the sixth material consists of a woven sheet made from glass fibre.

BRIEF DESCRIPTION OF THE DRAWINGS

The characteristics of the invention mentioned above, as well as others, will emerge more clearly from a reading of the following description of an example embodiment, the said description being given in relation to the accompanying drawings, among which.

DETAILED DESCRIPTION EMBODIMENTS OF THE INVENTION

Figure 1:
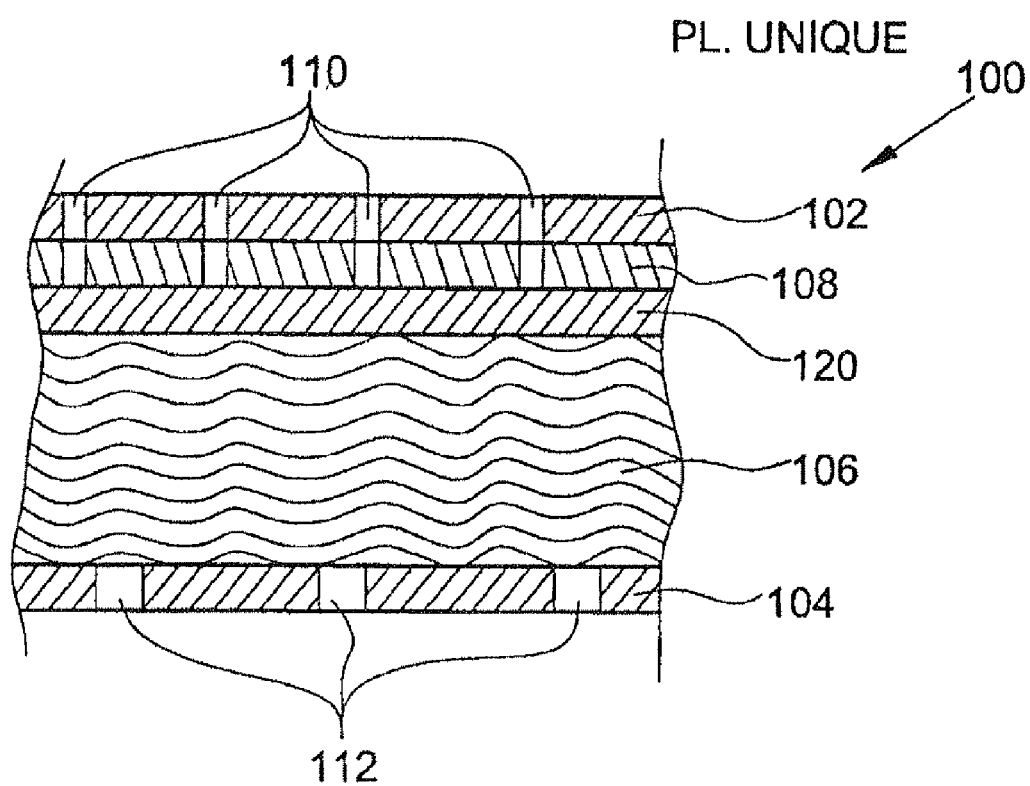
FIG. 1 depicts a view in section of an under-roof screen according to the invention.

FIG. 1 depicts an under-roof screen 100 comprising:
  a first layer 102 produced from a first material forming a thermal reflection barrier, for example of the metallic material or aluminised material type.
  a second layer 108 produced from a second woven material and bonded to the first layer 102;

a third layer 106 produced from a third insulating material and which is bonded to the second layer 108; and a fourth layer 104 produced from a fourth material forming a thermal reflection barrier, for example of the metallic material or aluminised material type, and which is bonded to the third layer 106.

The first layer 102 and the second layer 108 are provided with micro-perforations 110 providing permeability to water vapour and impermeability to water and the fourth layer 104 is provided with perforations 112 providing permeability to water vapour.

When the under-roof screen 100 is fitted under a building roof, the first layer 102 is oriented towards the roof, that is to say towards the outside of the building, whilst the fourth layer 104 is oriented towards the inside of the building.

The first layer 102 serves as a thermal barrier reflective to external heat wishing to enter the building. The first layer 102 can be metallic, such as for example aluminium, or metallised, such as for example aluminised material.

The fourth layer 104 serves as a thermal barrier reflecting the internal heat wishing to leave the building. The fourth layer 104 can be metallic, such as for example aluminium, or metallised, such as for example aluminised material.

The second layer 108 is a material which, because of its weaving, has high resistance to tearing and which thus makes the under-roof screen 100 stronger. The stronger structure of the under-roof screen 100 then enables it to be placed on main rafters separated by 90 cm. According to a particular embodiment, the second layer 108 is made from woven glass fibres and the diameter of the glass fibres is approximately 8 μm to 18 μm.

The third layer 106 serves, amongst other things, as a thermal insulator between the first layer 102 and the fourth layer 104 and thus prevents the creation of a heat bridge. According to a particular embodiment, the third layer 106 is a mattress made from non-woven glass fibres.

The water vapour that forms at the rear of the first layer 102, that is to say towards the inside of the building, must be discharged to the front of the first layer 102, that is to say towards the outside of the building. For this purpose, the first layer 102 and the second layer 108 are provided with micro-perforations 110. The micro-perforations 110 are sized so that the water vapour can pass through them without trickling water being able to penetrate them. This is because the water vapour that is situated towards the outside of the first layer 102 condenses under the effect of the external temperature and trickles onto the first layer 102 without penetrating it. The first layer 102 thus forms a barrier impermeable to water but permeable to water vapour.

According to a particular embodiment, the micro-perforations 110 have a diameter of around 20 μm but can vary from 10 μm to 60 μm.

To permit the discharge of the water vapour that forms inside the building, the fourth layer 104 is provided with perforations 112. The perforations 112 allow the passage of water vapour. The perforations 112 can have a diameter greater than or equal to the micro-perforations 110 since they play no role in the impermeability of the under-roof screen 100 with respect to the water coming from the outside of the first layer 102.

According to a particular embodiment, the perforations 112 have a diameter of around 50 μm to 150 μm.

In order to reinforce further the tightness and the permeability to the water vapour of the under-roof screen 100, the latter comprises a fifth layer 120 produced from a fifth breathing and impermeable material. The fifth layer 120 is bonded between the second layer 108 and the third layer 106. The fifth breathing material can be of the polyethylene, polyurethane or polypropylene type or a mixture of these products with calcium carbonate. According to a particular embodiment, the thickness of the fifth layer 120 is between 20 μm and 50 μm. This fifth layer 120 can be produced by stretching in order to produce a network of micro-channels allowing water vapour to pass.

The various layers 102, 108, 106, 104, 120 can be bonded together by heat bonding. For example, polyethylene can be used for forming the adhesion between the various layers 102, 108, 106 and 104.

The under-roof screen 100 described above is simple to manipulate and makes it possible to produce a heat insulation barrier as well as a barrier permeable to the water vapour whose structure is reinforced by the presence of the second woven material.

Figure 2:
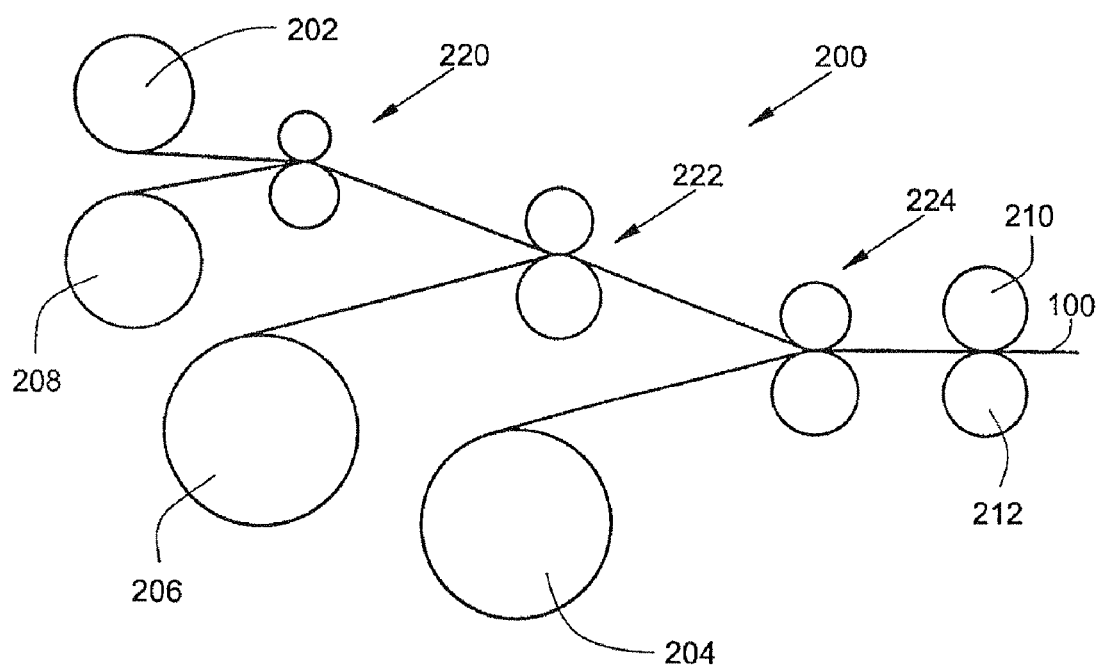
FIG. 2 depicts a device for manufacturing an under-roof screen according to the invention.

FIG. 2 depicts a device 200 from manufacturing an under-roof screen 100 according to one of the embodiments described above.

The manufacturing device 200 comprises a first bonding device 220, a second bonding device 222, a third bonding device 224 and a perforation device.

In the embodiment of the invention depicted here, each bonding device 220, 222, 224 takes the form of a pair of rollers, one or both of which can be raised in temperature, which are put in pressure against each other and between which the elements to be bonded pass.

The first material forming a heat reflection barrier, for example, metallic, is stored in the form of a first roller 202, the second woven material is stored in the form of a second roller 208, the third insulating material is stored in the form of a third roller 206, and the fourth material forming a heat reflection barrier, for example, metallic, is stored in the form of a fourth roller 204.

The perforation device here takes the form of a first perforation roller 210 designed to produce the micro-perforations 110 and a second perforation roller 212 designed to produce the perforations 112. For this purpose, the first perforation roller 210 and the second perforation roller 212 can be provided with spikes that project with respect to the surface of the perforation rollers 210 and 212 and perforate the first layer 102 and the second layer 108 on the one hand and the fourth layer 108 on the other hand.

In the case of the under-roof screen 100 with a fifth layer, the manufacturing device comprises a fifth roller and a fourth bonding device, the whole being disposed downstream of the first bonding device 220 and upstream of the second bonding device 222.

The method of manufacturing the under-roof screen 100 implemented in the manufacturing device 200 comprises:
  a step of supplying the first layer 102 produced from a first material forming a heat reflection barrier, for example metallic, by means of the first roller 202;
  a step of supplying the second layer 108 produced from a second woven material by means of the second roller 208;
  a step of bonding the second layer 108 to the first layer 102 by means of the first bonding device 220;
  a step of supplying a third layer 106 produced from a third insulating material by means of the third roller 206;
  a step of bonding the third layer 106 to the second layer 108 thus bonded by means of the second bonding device 222;
  a step of supplying a fourth layer 104 produced from a fourth material forming a heat reflection barrier, for example metallic, by means of the fourth roller 204;
  a step of bonding the fourth layer 104 to the third layer 106 thus bonded by means of the third bonding device 224;

a step of producing, in the first layer 102 and the second layer 108, micro-perforations 110 providing permeability to water vapour and impermeability to water by means of the first perforation roller 210; and a step of producing, in the fourth layer 104, perforations 112 providing permeability to water vapour by means of the second perforation roller 212.

In the case of the under-roof screen 100 comprising the fifth layer 120, the manufacturing method comprises:

a step of supplying a first layer 102 produced from a first material forming a heat reflection barrier, for example metallic;

a step of supplying a second layer 108 produced from a second woven material;

a step of bonding the second layer 108 to the first layer 102;

a step of supplying a fifth layer 120 produced from a fifth breathing material;

a step of bonding the fifth layer 120 to the second layer 108 thus bonded;

a step of supplying a third layer 106 produced from a third insulating material;

a step of bonding the third layer 106 to the fifth layer 120 thus bonded;

a step of supplying a fourth layer 104 produced from a fourth material forming a heat reflection barrier, for example metallic;

a step of bonding the fourth layer 104 to the third layer 106 thus bonded;

a step of producing, in the first layer 102 and the second layer 108, micro-perforations 110 providing permeability to water vapour and impermeability to water; and a step of producing, in the fourth layer 104, perforations 112 providing permeability to water vapour.

Figure 3:
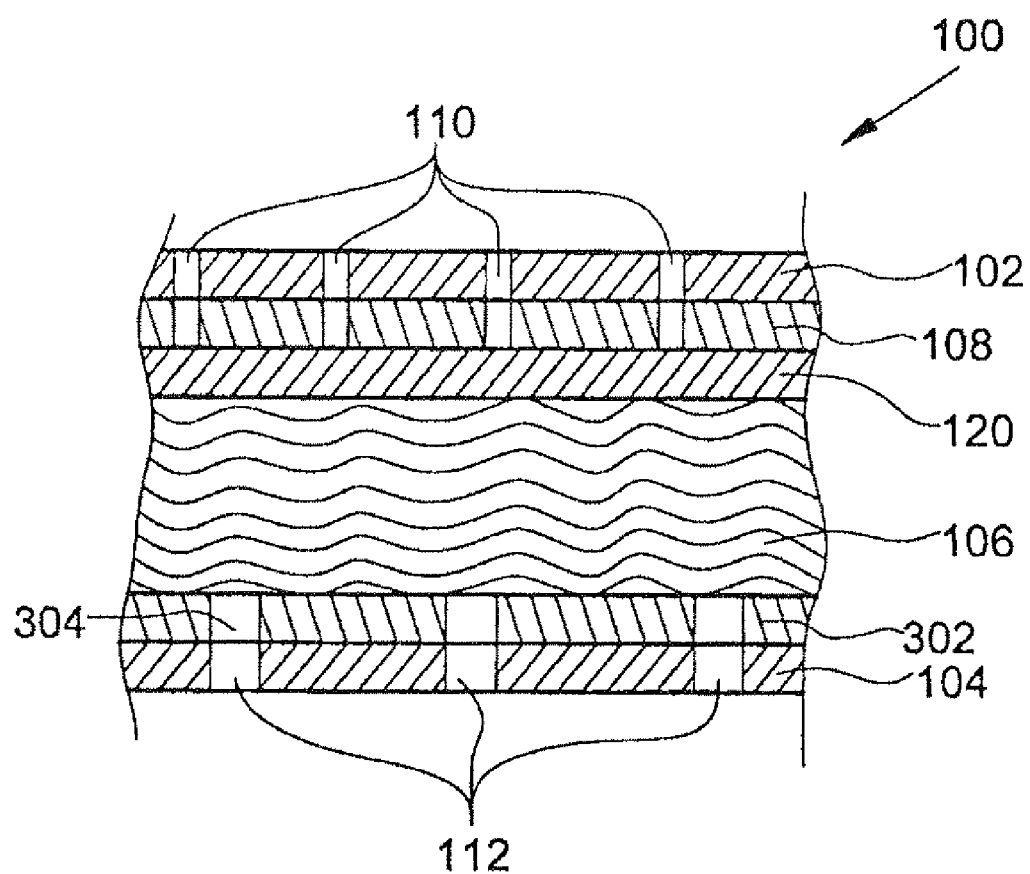
FIG. 3 depicts a view in section of an under-roof screen according to another embodiment of the invention.

FIG. 3 depicts another embodiment, in which the under-roof screen 100 comprises a sixth layer 302 produced in a sixth material consisting of a woven sheet bonded to the fourth layer 104 and disposed between the third layer 106 and the fourth layer 104. Because of its weaving, the sixth layer 302 has high resistance to tearing and thus makes the under-roof screen 100 stronger. In order to ensure permeability to water vapour, the sixth layer 302 is provided with perforations 304 aligned with the perforations 112 in the fourth layer 104. According to a particular embodiment, the sixth material consists of a woven sheet made from glass fibre.

The method of manufacturing the under-roof screen 100 then comprises, before or after the step of supplying the fourth layer 104, a step of supplying the sixth layer 302 and a step of bonding the sixth layer 302 to the fourth layer 104. The step of bonding the fourth layer 104 to the third layer 106 is then replaced by a step of bonding the sixth layer 302 to the third layer 106.

The use of a first metallic material, a fourth metallic material, a second material made from glass fibre and a third material made from glass fibre makes it possible to obtain a highly non-combustible under-roof screen 100.

Fitting the fifth material made from polyethylene reduces this non-combustibility capacity but, the proportion of fifth material remaining low, the non-combustibility capacity of the under-roof screen 100 remains appreciably superior to that of under-roof screens of the prior art.

Naturally the present invention is not limited to the examples and embodiments described and depicted but is open to many variants accessible to persons skilled in the art.

The invention claimed is:

1. Under-roof screen (100) comprising:
    a first layer (102) produced from a first metallic or metallised material forming a thermal reflection barrier;
    a second layer (108) produced from a woven material and bonded to the first layer (102);
    a third layer (106) produced from an insulating material and bonded to the second layer (108); and
    a fourth layer (104) produced from a second metallic or metallised material forming a thermal reflection barrier and bonded to the third layer (106),
    wherein the first layer (102) and the second layer (108) are provided with micro-perforations (110) providing permeability to water vapour and impermeability to water and the micro-perforations (110) are aligned through the first and second layers (102, 108), and wherein the fourth layer (104) is provided with perforations (112) providing permeability to water vapour and the micro-perforations (110) are smaller in size than the perforations (112).

2. Under-roof screen (100) according to claim 1, characterised in that the bonding of the first through fourth layers (102, 108, 106, 104) together is effected by thermal bonding.

3. Under-roof screen (100) according to claim 1, characterised in that the diameter of the micro-perforations (110) is less than or equal to 20 μm.

4. Under-roof screen (100) according to claim 1, characterised in that the first material and the fourth material are aluminium or an aluminised material.

5. Under-roof screen (100) according to claim 1, characterised in that the woven material is woven glass fibre.

6. Under-roof screen (100) according to claim 1, characterised in that the insulating material is non-woven glass fibre.

7. Under-roof screen (100) according to claim 1, characterised in that it comprises a fifth layer (120) produced from a fifth breathing material, the said fifth layer (120) being bonded between the second layer (108) and the third layer (106).

8. Under-roof screen (100) according to claim 7, characterised in that the fifth breathing material is of the polyethylene, polyurethane or polypropylene type, or a mixture of these products with calcium carbonate.

9. Under-roof screen (100) according to claim 1, characterised in that it comprises a sixth layer (302) produced from a sixth material consisting of a woven sheet bonded to the fourth layer (104) and disposed between the third layer (106) and the fourth layer (104).

10. Under-roof screen (100) according to claim 9, characterised in that the sixth layer (302) is provided with perforations (304) aligned with the perforations (112) in the fourth layer (104).

11. Under-roof screen (100) according to claim 8, characterised in that the sixth material consists of a woven sheet made from glass fibre.

12. Method of manufacturing an under-roof screen (100) according to claim 1, characterised in that the method comprises:
    a step of supplying a first layer (102) produced from a first metallic or metallised material forming a thermal reflection barrier;
    a step of supplying a second layer (108) produced from a woven material;
    a step of bonding the second layer (108) to the first layer (102);
    a step of supplying a third layer (106) produced from a insulating material;
    a step of bonding the third layer (106) to the second layer (108) thus bonded;
    a step of supplying a fourth layer (104) produced from a second metallic or metallised material forming a thermal reflection barrier;

a step of bonding the fourth layer (104) to the third layer (106) thus bonded;

a step of producing, in the first layer (102) and second layer (108), micro-perforations (110) providing permeability to water vapour and impermeability to water, wherein the micro-perforations (110) are aligned through the first and second layers (102, 108); and a step of producing, in the fourth layer (104), perforations (112) providing permeability to water vapour, wherein the micro-perforations (110) are smaller in size than the perforations (112).

13. Method of manufacturing an under-roof screen (100) according to claim 7, characterised in that the method comprises:

a step of supplying a first layer (102) produced from a first metallic or metallised material forming a thermal reflection barrier;

a step of supplying a second layer (108) produced from a woven material;

a step of bonding the second layer (108) to the first layer (102);

a step of supplying a fifth layer (120) produced from a fifth breathing material;

a step of bonding the fifth layer (120) to the second layer (108) thus bonded;

a step of supplying a third layer (106) produced from a insulating material;

a step of bonding the third layer (106) to the fifth layer (120) thus bonded;

a step of supplying a fourth layer (104) produced from a second metallic or metallised material forming a thermal reflection barrier;

a step of bonding the fourth layer (104) to the third layer (106) thus bonded;

a step of producing, in the first layer (102) and second layer (108), micro-perforations (110) providing permeability to water vapour and impermeability to water, wherein the micro-perforations (110) are aligned through the first and second layers (102, 108); and a step of producing, in the fourth layer (104), perforations (112) providing permeability to water vapour, wherein the micro-perforations (110) are smaller in size than the perforations (112).

* * * * *